United States Patent [19]

Ishii et al.

[11] 4,270,691
[45] Jun. 2, 1981

[54] METHOD OF JOINING CERAMIC MEMBERS AND ITS APPLICATION TO OXYGEN SENSOR ELEMENT MANUFACTURE

[75] Inventors: Shinya Ishii, Toyoake; Takaharu Saito, Nagoya; Masahiko Sugiyama; Takashi Kamo, both of Toyota, all of Japan

[73] Assignee: Toyota Jidosha Kogyo Kabushiki Kaisha, Toyota, Japan

[21] Appl. No.: 5,459

[22] Filed: Jan. 22, 1979

[30] Foreign Application Priority Data

Aug. 18, 1978 [JP] Japan ................................ 53-100691

[51] Int. Cl.³ .............................................. B23K 20/16
[52] U.S. Cl. ..................................... 228/194; 29/570; 228/263 A
[58] Field of Search ............... 228/121, 124, 193, 194, 228/263 A; 29/570; 204/195 S; 65/43

[56] References Cited

U.S. PATENT DOCUMENTS

| 3,333,324 | 8/1967 | Roswell et al. ................... 228/193 X |
| 3,531,853 | 10/1970 | Klomp .................................... 228/193 |
| 3,555,667 | 1/1971 | Carlson et al. .................... 228/193 X |
| 4,050,956 | 9/1977 | De Bruin et al. ................. 228/193 X |
| 4,051,582 | 10/1977 | Eschler et al. .................... 228/121 X |

FOREIGN PATENT DOCUMENTS 2808621  9/1978  Fed. Rep. of Germany ....... 204/195 S

*Primary Examiner*—Gil Weidenfeld
*Assistant Examiner*—Kenneth J. Ramsey
*Attorney, Agent, or Firm*—Brisebois & Kruger

[57] ABSTRACT

Metallized layers are formed respectively on the surfaces to be joined of the ceramic members by performing metallized treatment on the surfaces, and then, these metallized layers are pressed against each other, and under pressure are diffusion-bonded at high temperature. A metal foil which can form a solid solution with the metallized layers can be interposed between the metallized layers before diffusion-bonding. This method can be used to manufacture an oxygen sensor element.

8 Claims, 6 Drawing Figures

METHOD OF JOINING CERAMIC MEMBERS AND ITS APPLICATION TO OXYGEN SENSOR ELEMENT MANUFACTURE

BACKGROUND OF THE INVENTION

The present invention relates to a method of joining ceramic members which are functional parts of automobiles, etc. and its application to the manufacture of an oxygen sensor element.

To be more specific, the present invention relates to a method of joining and sealing together ceramic members under high-temperature and high-pressure conditions to provide a very durable joint, and its application to the manufacture of an oxygen sensor element.

In recent years use of ceramic members as functional parts of automobiles and internal combustion engines has positively been considered. These ceramic members have often to operate in a hot gas and are required to be gas-tight. The conventional methods of joining ceramic members can be broadly classified as: using an inorganic bonding agent; using an activated metal; using metallization; and using glass. Among others, the metallizing process has been considered as one suitable for joining members of a motor vehicle oxygen sensor element with a joint strength high enough to stand high temperatures and provide a gas-tight joint.

In the metallizing process the ceramic members to be joined are daubed with a paste of a metal powder such as molybdenum, manganese or tungsten or a combination of these metals blended with an organic substance such as methyl cellulose in an organic solvent such as butyl acetate; the ceramic members are then baked at 1300°–1600° C. in a reducing atmosphere to form a metallized layer thereon; the metallized layer is then plated with a metal like nickel; and thereafter silver-brazing is done between a plated layer and a metal, or between the plated layers.

In such a metallizing process, a firm bonding of the metallized layer on the ceramic surface is effected through reaction between an oxide in the metal used for metallizing and a glass contained in the ceramic, thereby forming a bonding layer.

Thus, the metal used in this process is usually one which readily oxidizes and a precious metal, say, platinum would not yield a firm bond. Therefore when brazing is done between a metallized layer obtained by using a precious metal and a metal, or between metallized layers of precious metal, the brazing material produces an excessive solid solution of the metal in the metallized layers, or even attacks the metallized layer itself, resulting in an insufficient strength of joint.

For this reason, the conventional metallizing process cannot produce a sufficiently strong joint when precious metal is used. However, where an oxygen sensor has to operate in a hot oxidizing atmosphere, its members have to be joined using a precious metal, but there is the drawback that an oxygen sensor with sufficient joint strength cannot be obtained by the conventional method.

SUMMARY OF THE INVENTION

The primary object of the present invention is to provide a method of joining ceramic members with a joint strong enough to stand high temperature and high pressure service conditions and which is sufficiently gas-tight, by a simple process.

Another object of the present invention is to provide a simple process of manufacturing a highly durable oxygen sensor which can stand high temperature and high pressure service with full gas-tightness maintained.

Still another object of the present invention is to provide a sealing technique for a ceramic vessel subjected to internal pressure at high temperature.

Still another object of the present invention is to provide a method of joining ceramic members which have to serve in various atmospheres at high temperatures.

Still another object of the present invention is to provide a far more durable oxygen sensor than the conventional ones which are available for measurement of oxygen partial pressure, not only in automobiles but also in molten metal.

DETAILED DESCRIPTION OF THE PREFERRED FORMS OF THE INVENTION

A standard solid pole oxygen sensor element obtained by the method according to the present invention will be described.

Figure 1:
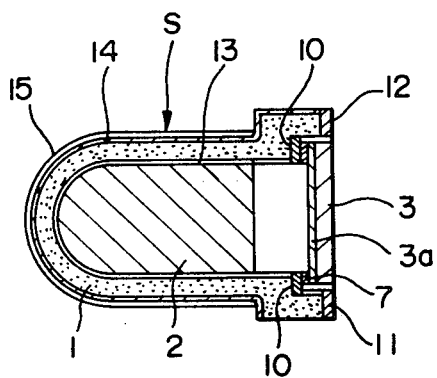
FIG. 1 is a sectional view of a standard solid pole oxygen sensor element according to the invention.

In FIG. 1, Fe- or Ni-powder and its oxide 2 are charged into a solid electrolyte vessel 1 made of $ZrO_2$ and the like with its internal and external surfaces plated with, say, platinum to form metal electrode layers. The opening of the vessel 1 is sealed with a lid 3 to form an oxygen sensor element S. The seal between lid 3 and vessel 1 includes a metallized layer 3a, of precious metal on the inner surface of lid 3, and a metallized layer 6 of precious metal on a shoulder of the vessel. Between layers 3a and 6 is a thin ring 7 of precious metal which has formed a solid solution with the metallized layers to seal the lid to the vessel, in accordance with the invention.

The opening of vessel 1 can be formed with a counterbore shaped recess to define the shoulder 10 on which metallized layer 6 is formed. The inside surface of vessel 1 has an electrode layer 13 electrically connected to a contact electrode 11 at one side only of the end of the vessel, by a layer of conductive material 11' which goes through the joint between the lid 3 and the vessel. At the other side of the vessel is a contact electrode 12 electrically connected to an external electrode layer 14 of the vessel by a layer of conductive material 12' on the outside of the vessel. A coating 15 is provided on electrode layer 14.

The working principle of the standard solid pole oxygen sensor element S is as follows. By utilizing an electromotive force developed by a difference in oxygen partial pressure between the inside and the outside of the vessel 1, when the vessel 1 is exposed to an atmosphere to be measured (usually at over 300° C., at which temperature the solid electrolyte of the vessel 1 becomes electroconductive), the oxygen partial pressure in the atmosphere can be determined with reference to the equilibrium oxygen partial pressure from the Fe- or Ni-powder and its oxide 2 in the vessel 1. Hence, important requirements are that perfect sealing must be maintained between the vessel 1 and the lid 3 for the purpose of keeping the oxygen partial pressure within the vessel 1 constant so that the vessel 1 will be fully gas-tight; the strength of the seal between the vessel 1 and the lid 3 must be high enough to stand an internal pressure of several atms. of gases other than oxygen in the vessel 1, say, nitrogen gas; and this seal between the vessel 1 and the lid 3 must be strong enough to withstand temperatures as high as 950° C., i.e., the maximum temperature of auto exhaust gas, because the oxygen partial pressure has to be measured in the exhaust gas of the automobile.

The basic process according to the invention comprises, forming a metallized layer by metallizing treatment on each of the surfaces of the ceramic members to be joined; then directly mating or engaging the two metallized layers or indirectly mating them by insertion between the layers of a foil of like metal or a metal which makes a solid solution with the metallized layers; and then diffusion-bonding said ceramic members under pressure at a high temperature.

The basic process of the invention as an application to the manufacture of a standard solid pole oxygen sensor element comprises, separately preparing a solid electrolyte vessel having one end open, and a lid or closure of solid electrolyte or common ceramic; then forming metal electrode layers on the inside and outside surface of the solid electrolyte vessel; then charging a standard oxygen partial pressure-generating metal or a mixture of such a metal and its oxide into the solid electrolyte vessel; then forming metallized layers at the opening of the vessel and at the connection surfaces of the lid with the vessel through metallizing treatment; then directly mating the metallized layers, or inserting between the layers a foil of the same metal as the metallized layers or a metal which makes a solid solution with the metallized layers; and then diffusion-bonding the lid to the vessel while its opening is sealed by the lid under pressure at a high temperature.

Next, some examples of manufacturing a standard solid pole oxygen sensor element according to the present invention will be described referring to the drawings.

EXAMPLE 1

Figure 3:
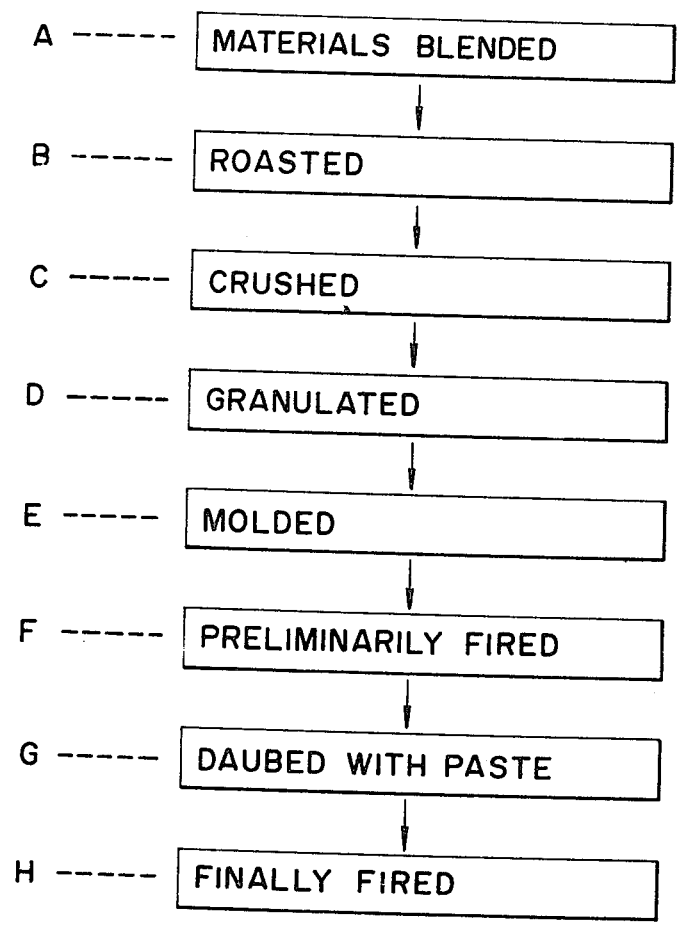
FIG. 3 is a block diagram showing the sequence of manufacturing a vessel and lid of solid electrolyte according to the invention.

The steps of preparing, according to the invention, a solid electrolyte vessel 1 and a lid 3 and then forming a metallized layer on the vessel 1 and on the lid 3 are shown in FIG. 3.

In the materials blending step A of FIG. 3, zirconia powder ($ZrO_2$) and yttria powder ($Y_2O_3$) are blended in a mol ratio of 10:1, followed by a roasting step B for one hour at 1400° C. The materials roasted in step B are crushed for 50 hours in a wet ball mill during the crushing step C, which is followed by the granulating step D. In the granulating step D, granulation takes place in a spray drier with addition of about 1% PVA to the solids.

Then, in the molding step E the grains obtained are molded by a metal or rubber mold into the forms or shapes of the vessel 1 and lid 3. The molded products are then fired at 1200°–1400° C. during the preliminary firing step F. In the next step G the vessel 1 and the lid 3 are each daubed with platinum paste and in the final firing step H, there is firing at 1600°–1750° C. to form metallized layers 6 and 3a, on the vessel 1 and the lid 3, respectively.

These steps A–H, complete the process of preparing the solid electrolyte vessel 1 and lid 3, and the forming of a metallized layer of platinum on their surfaces to be joined.

Figure 2:
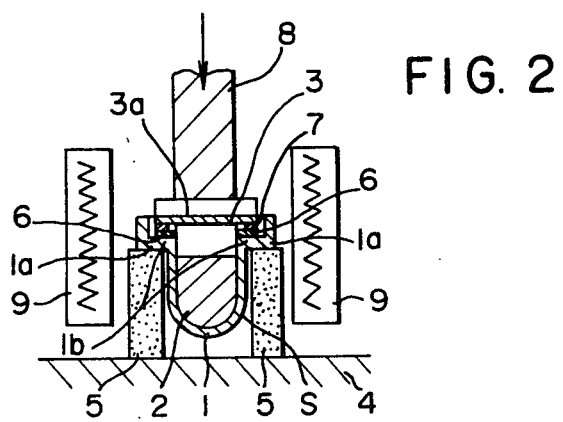
FIG. 2 is a sectional view in schematic illustrating a joining method according to the present invention.

Next, the process of manufacturing, according to the invention, a standard solid pole oxygen sensor element S from the vessel 1 and the lid 3 thus produced will be described referring to FIG. 2. The vessel 1 is set on a press jig 5,5 by engaging the flange 1a of the vessel 1 with the top end of the jig 5,5 which is supported on a mount or base 4. Iron powder 2 is charged into the vessel 1. A platinum ring 7 is placed on a metallized layer 6 of a precious metal (platinum) formed at the joint 1b and the lid 3 is put over said platinum ring 7. The metallized layer 3a of a precious metal (platinum) formed on the underside of the lid 3 contacts the top side of said platinum ring 7. Thus said platinum ring 7 comes between the metallized layer 6 and the metallized layer 3a. Thereupon, the joint 1b of vessel 1 and the lid 3 is heated to 1000°–1300° C. by the heating furnace 9, while a plunger 8 of the jig pressurizes the lid 3 from above, thereby diffusion-bonding the vessel 1 and the lid 3 with the junction plane pressure held at 20–40 kg/cm$^2$ for 15–60 minutes. If a high-frequency heater is employed as the heating furnace 9, the productivity is enhanced.

Figure 4:
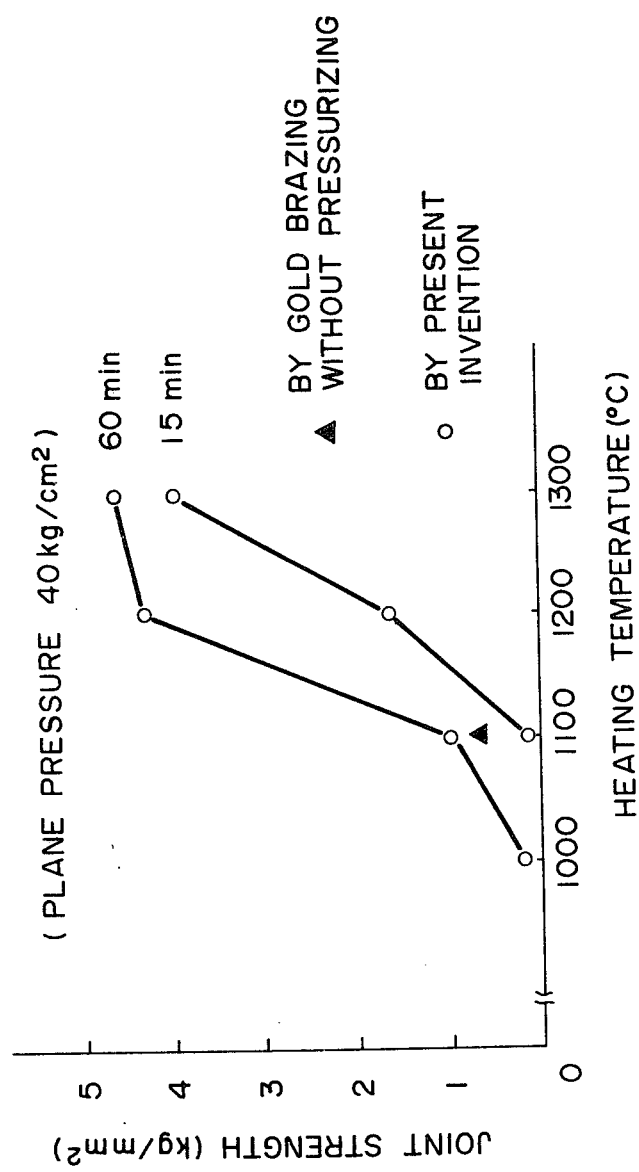
FIG. 4 is a diagram showing the strength relation of ceramic members joined by the method according to the present invention.
Figure 5:
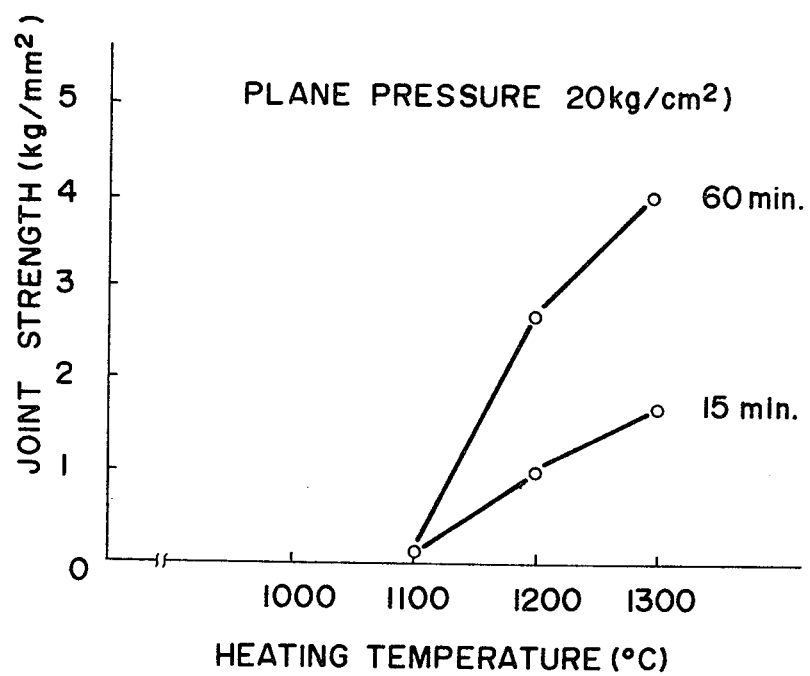
FIG. 5 is also a diagram showing the strength relation of ceramic members joined by the method according to the present invention.

In FIGS. 4 and 5, the joint strength of the vessel 1 and the lid thus diffusion-bonded as evaluated by pull-off tests is compared with the result in the conventional case of using a gold brazing instead of the platinum ring 7. It is seen from these Figs. that the joint strength obtained by heating at 1200°–1300° C. and pressurizing at 40 kg/cm$^2$ is far higher than that obtained by the conventional gold brazing. Such a high joint strength is obtained for the following reasons: first, an appropriate setting of temperature and pressure precludes the possibility of erosion of the metal in the metallized layer due to excessive solid solution in the interposed metal; second, as the result of the pressure at the boundary between the metallized layer and the ceramic at high temperature, the metallized layer can go into ceramic cavities or intercrystalline microstructure; and, third, a pull-off of the lid 3 during testing occurs in this invention by ceramic fracture, whereas with the coventional gold brazing a pull-off occurs between the ceramic and the metallized layer, which testifies to the extremely high joint strength between the metallized layer and the ceramics in this invention.

EXAMPLE 2

In this example a mixture of platinum powder and 5–10% heat-resistant glass powder blended in methyl cellulose, polyacrylamide and butyl acetate was used instead of the platinum paste in Example 1. All the other steps were the same as in Example 1. The joint strength obtained was virtually the same as in Example 1.

EXAMPLE 3

Instead of the platinum ring 7 in Example 1, a gold ring was used between metallized layers 3a and 6, but there was no essential difference from the Example 1 results except a slight decrease in the joint strength. The heating temperature was set at 600°–1000° C.

EXAMPLE 4

In the heating step of this example 4, the heating is done by high frequency, but there was no essential difference from Example 1. However, since the platinum ring 7 and the metallized layers 6,3a are suddenly heated in this case, the ceramic part can be destroyed by thermal stress. To prevent this, an appropriate preheating of the vessel and lid is required. This preheating can be easily done by on-off application of low powder.

High-frequency heating will facilitate automation with its practical advantages in production. The joint strength of Example 4 was the same as Example 1.

Next, are results of testing.

Test 1

The durability and integrity of the seal of element S produced under the conditions in Examples 1-4 was evaluated in a test. In this test the seal at the joint was evaluated in terms of weight increase in the element S which had been immersed in water at 5 atms. pressure (other liquid may be used) for about one minute and then removed from the water to dry on the outside. A weight increase of less than 1 mg was rated "no increase" and qualified as an acceptable product.

To evaluate the seal durability at high temperature an element S with a good seal (acceptable product) was submitted to a thermal test of heating to 950° C. and then quenching to the ambient temperature. After 1000 cycles of this test all of the elements S obtained in Examples 1-4 turned out to have a good seal, but most of the gold brazed elements S obtained by the conventional sealing process failed in the test after 100 cycles, showing a poor seal.

Test 2

Figure 6:
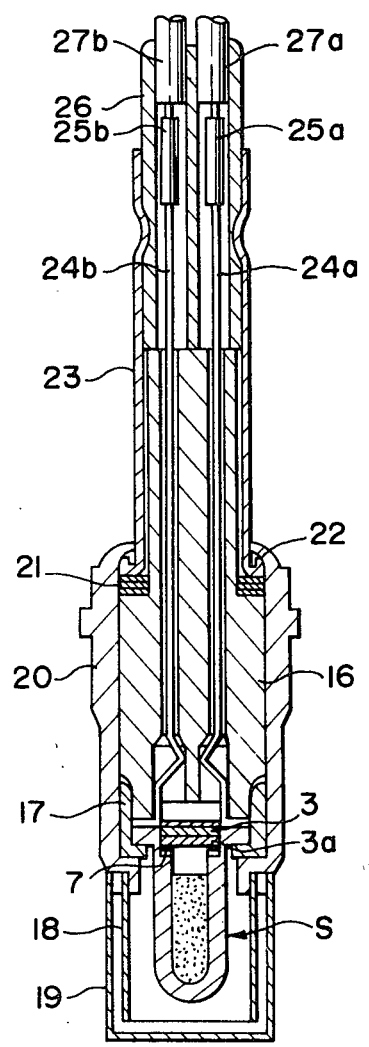
FIG. 6 is a sectional view of an oxygen sensor element manufactured by the method according to the present invention as assembled in a standard solid pole oxygen sensor unit.

In Examples 1-4, the vessel 1 formed is illustrated in FIG. 1, and after its stepped part or flange 10 and sides 11,12 were metallized, the inside and outside surfaces of the vessel 1 were chemically plated with chloroplatinic acid and sodium boron hydride, followed by electroplating to constitute the inside and outside electrode layers 13,14. Further a coated layer 15 was formed on the outside electrode layer 14 by plasma spraying. The inside and outside electrode layers 13,14 were electrically connected to the metallized layers formed at the sides 11,12. An element S thus produced was installed in a standard solid pole oxygen sensor as illustrated in FIG. 6. The element S is supported at the end of an aluminum electrical insulation tube 16 by an aluminum flange 17 within a stainless steel holder 20 integrated to stainless steel double protective covers 18,19. The flange of element S is secured and sealed within the holder 20 using the washers 21, ring 22, and a stainless protective cover 23. The upper end of holder 20 is rolled in to complete the connection.

Electric connection to the inside and outside electrode leads 11 and 12 of the element S is made by contact with the lead wires 24a,24b running through the insulation tube 16. The lead wires 24a,24b pass through a Teflon protective cover sleeve 26 inserted into the top of the protective cover 23 and exit as insulation covered wires 27a,27b from the junctions 25a,25b.

The standard solid pole oxygen sensor thus constructed was attached to the exhaust pipe of a 2000 CC engine and submitted to a high-temperature service test of 200 hours at an exhaust gas temperature of 900° C., followed by 1000 hours of hot-cold cycles of 850° C.-ambient temperature.

According to the results of the testing, no products except the ones of Example 3 developed any faults electrically or otherwise. Among the products of Example 3, some deteriorated in electrical performance but none failed to work.

What is claimed is:

1. Method of forming an air-tight joint between ceramic members, comprising the steps of:
    forming a metallized layer by metallizing treatment on each surface of ceramic members to be joined;
    aligning the so formed metallized layers of the ceramic members; and,
    diffusion-bonding said ceramic members by pressing them together under high pressure and high temperature conditions;
    and wherein the method further comprises inserting between the metallized layers, prior to diffusion-bonding, a foil of a metal selected from the group consisting of the same metal as a metallized layer or a metal which forms a solid solution with the metallized layer during diffusion-bonding.

2. The method of claim 1 wherein said metallized layers each comprise layers of a precious metal.

3. The method of claim 1, wherein said step of diffusion-bonding includes high-frequency heating of said ceramic members.

4. Method of manufacturing a solid pole oxygen sensor element, comprising the steps of:
    separately preparing a one-end open solid electrolyte vessel and a lid of a solid electrolyte or common ceramic;
    forming metal electrode layers on the inside and outside of said vessel;
    charging into said vessel a standard oxygen partial pressure generating metal or mixture of a metal and its oxide;
    forming metallized layers by metallizing treatment on portions of said vessel and lid to be joined;
    mating said metallized layers of said lid and said vessel;
    and sealing the opening of said vessel by diffusion-bonding said vessel and said lid under high pressure at high temperature to form a strong air-tight joint between the vessel and the lid;
    and wherein said step of mating comprises inserting between said metallized layers of the lid and the vessel a foil of the same metal as the metallized layers, or a foil of a metal which makes a solid solution with said metallized layers.

5. The method of claim 4, wherein said vessel and said lid are heated at high temperature by high-frequency heating.

6. The method of claim 4, wherein said metallized layer is constituted of a precious metal.

7. The method of claim 4, wherein said metal electrode layers formed of the inside and outside surfaces of said vessel are formed by plating with a precious metal.

8. The method of claim 4, wherein said metal foil inserted between said metallized layers is a platinum ring.

* * * * *